US011675859B2

United States Patent
Chen et al.

(10) Patent No.: US 11,675,859 B2
(45) Date of Patent: *Jun. 13, 2023

(54) DATA PROCESSING SYSTEM FOR GENERATING ENTRIES IN DATA STRUCTURES FROM NETWORK REQUESTS

(71) Applicant: Google LLC, Mountain View, CA (US)

(72) Inventors: Junfu Chen, Sunnyvale, CA (US); Tal Max Akabas, Palo Alto, CA (US); Ryan Scott Elmquist, San Francisco, CA (US); Lianxiao Qiu, San Jose, CA (US); Rahul Shirish Oak, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 17/161,455

(22) Filed: Jan. 28, 2021

(65) Prior Publication Data

US 2021/0149977 A1     May 20, 2021

Related U.S. Application Data

(63) Continuation of application No. 15/983,544, filed on May 18, 2018, now Pat. No. 10,915,587.

(51) Int. Cl.
*G06F 16/215* (2019.01)
*G06F 16/9535* (2019.01)
*G06F 16/22* (2019.01)

(52) U.S. Cl.
CPC ........ *G06F 16/9535* (2019.01); *G06F 16/215* (2019.01); *G06F 16/2228* (2019.01)

(58) Field of Classification Search
CPC . G06F 16/215; G06F 16/2228; G06F 16/9535
See application file for complete search history.

(56) References Cited

U.S. PATENT DOCUMENTS

| | | |
|---|---|---|
| 6,721,749 B1 | 4/2004 | Najm et al. |
| 7,134,137 B2 | 11/2006 | Joshi et al. |
| 8,620,933 B2 | 12/2013 | Holmes et al. |
| 8,706,551 B2 | 4/2014 | Roetter |
| 9,633,378 B1 | 4/2017 | Nath et al. |
| 10,397,236 B1 | 8/2019 | Chadha et al. |
| 2011/0055926 A1 | 3/2011 | Bennett et al. |
| 2012/0054019 A1 | 3/2012 | Kitts et al. |
| 2013/0173777 A1 | 7/2013 | Fu et al. |

(Continued)

*Primary Examiner* — Robert W Beausoliel, Jr.
*Assistant Examiner* — Nirav K Khakhar
(74) *Attorney, Agent, or Firm* — Fish & Richardson P.C.

(57) ABSTRACT

A data processing system for searching network requests to extract values of parameters in the network requests includes a shared memory that stores data structures, wherein each of the data structures is stored in association with a value of a key, and wherein each of the data structures includes one or more entries for storage of data representing a network request. A parser engine parses a particular network request for values of parameters and for a value of a key. A search engine queries the shared memory for a particular data structure stored in association with the value of the key. A logic engine detects an absence of a particular entry, in the particular data structure, that stores data representing the particular network request, generates an entry in the particular data structure, and stores in the generated entry the values of the parameters.

19 Claims, 7 Drawing Sheets

(56) References Cited

U.S. PATENT DOCUMENTS

| | | |
|---|---|---|
| 2014/0025995 A1 | 1/2014 | Narayanan |
| 2014/0278754 A1 | 9/2014 | Cronin |
| 2014/0310679 A1 | 10/2014 | Bhattacharya et al. |
| 2015/0180894 A1 | 6/2015 | Sadovsky et al. |
| 2016/0041894 A1 | 2/2016 | Reid et al. |
| 2019/0253507 A1 | 8/2019 | Angeles |
| 2019/0387012 A1 | 12/2019 | Orihara et al. |

# DATA PROCESSING SYSTEM FOR GENERATING ENTRIES IN DATA STRUCTURES FROM NETWORK REQUESTS

CROSS-REFERENCE TO RELATED APPLICATION

This is a continuation of, and claims priority to, U.S. application Ser. No. 15/983,544, filed on May 18, 2018, the entire contents of which is incorporated herein by reference.

BACKGROUND

Publishers develop online applications that are downloaded and installed by users. When a user interacts with the application, analytical data is generated that is related to the application. A publisher may wish to track how many users download the application. The application can include interactive aspects. A user can interact with the application and generate additional analytical data. The publisher of the application may wish to track the interactions taking place with users in the application.

SUMMARY

The data processing system includes an input port that receives network requests from a remote source, where each network request includes values of parameters and further includes a value of a key; a shared memory that stores data structures, where each of the data structures is stored in association with a value of a key, and where each of the data structures includes one or more entries for storage of data representing a network request; a parser engine that parses a particular network request of the network requests for values of parameters included in the particular network request and for a value of a key included in the particular network request; a search engine that queries the shared memory for a particular data structure stored in association with the value of the key included in the particular network request; and a logic engine that detects an absence of a particular entry, in the particular data structure, that stores data representing the particular network request, generates an entry in the particular data structure for data representing the particular network request, and stores in the generated entry the values of the parameters.

In some implementations, at least one of the parameters comprises data indicative of an interaction between an end user and a computing resource of the remote source, and the generated entry in the particular data structure is configured to store data representing the interaction. In some implementations, the remote source comprises a computing system of a publisher of online digital content, and the computing resource comprises an application published by the publisher.

In some implementations, data processing system includes an interface generation engine that configures a user interface for presentation at the computing resource of the remote source, the user interface configured to include a control associated with the at least one of the parameters, the control being configured to specify an action of the logic engine in response to the data representing the interaction.

In some implementations, the data representing the interaction comprises conversion data. In some implementations, the particular data structure is associated with an account of the remote source, and the value of the key represents the account of the remote source. In some implementations, the account is a first account and the remote source is associated with a plurality of accounts, and the search engine is configured to query a plurality of data structures each being associated with a second account of the plurality of accounts of the remote source.

In some implementations, the generated entry is included in each of the plurality of data structures, in response to detecting the absence of the particular entry in the plurality of data structures. In some implementations, the generated entry in the particular data structure is searchable by the search engine in response to receiving a subsequent network request from the remote source. In some implementations, the network request comprises an HTTP request.

The described system may provide for one or more benefits or advantages. The data processing system data processing system enables application publishers to track analytical data of their applications without needing to pre-declare interaction data (e.g., conversion data, event data, etc.) that the application publisher wishes to track with the data processing system. The data processing system can include or be associated with a platform (e.g., advertising platform, analytics tracking service, etc.) for promoting or monetizing the application. A network request (e.g., HTTP request) is automatically parsed for parameters that are indicative of an interaction (e.g., a conversion, event, etc.) that can be tracked by the data processing system. The parameters are automatically extracted from the network request without the publisher having to configure the network request to include one or more parameters in a specified format. A library of interactions is generated for the publisher and is accessible across multiple accounts of the publisher. The data processing system generates a formatted network request that is formatted for the platform, which can be included in the data processing system. The data processing system includes an improved flexibility of handling network requests relative to computing systems that do not include this data processing system because the network requests need not be formatted in a predefined way for the data processing system to extract interaction data from the network request.

The details of one or more embodiments are set forth in the accompanying drawings and the description below. Other features, objects, and advantages of the systems and techniques described herein will be apparent from the description and drawings, and from the claims.

DESCRIPTION OF DRAWINGS

Like reference symbols in the various drawings indicate like elements.

DETAILED DESCRIPTION

Figure 1:
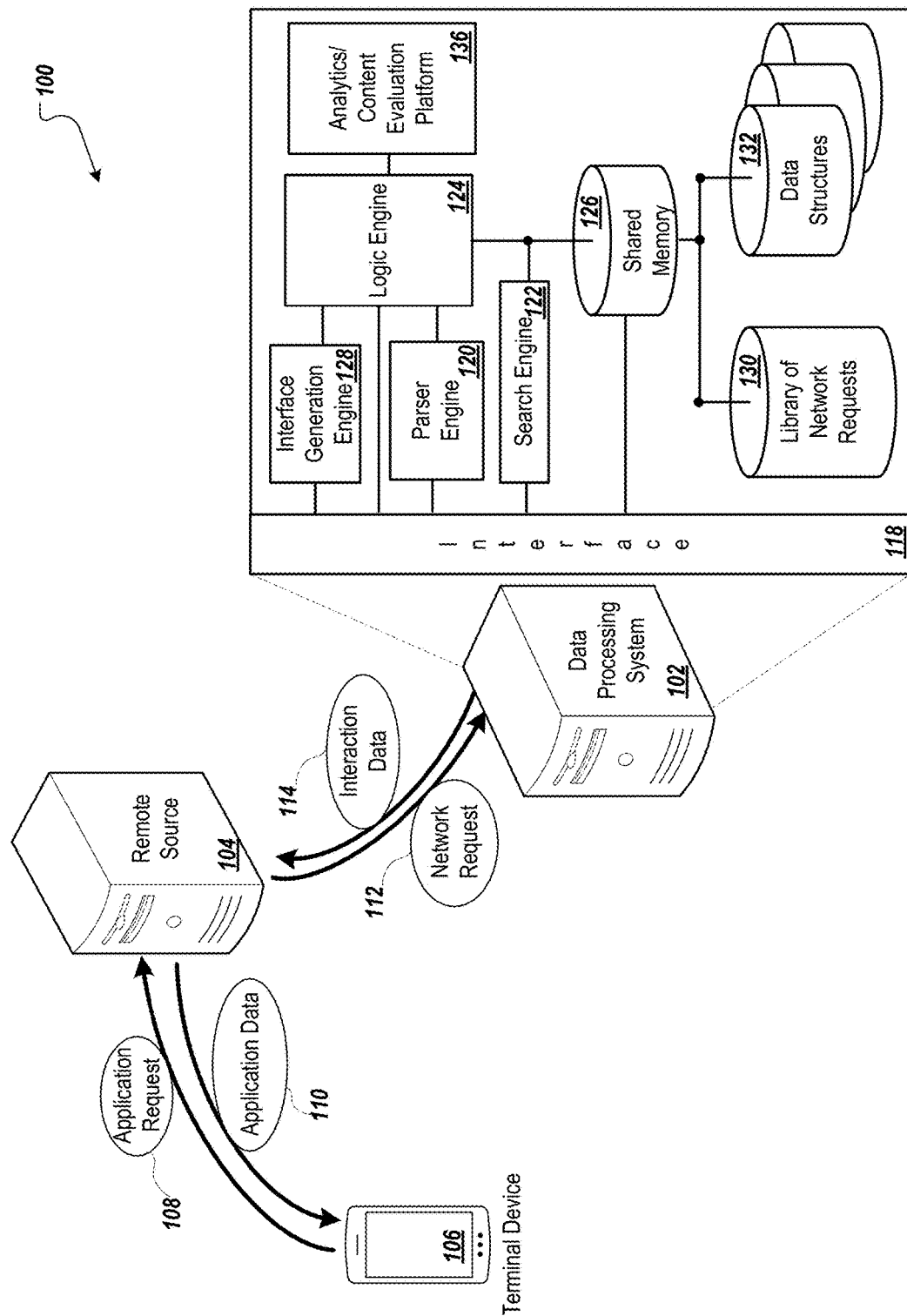
FIG. 1 is a diagram of an environment of the data processing system.

Referring to FIG. 1, networked environment 100 includes a data processing system 102 that is configured to communicate (e.g., over a network, not shown) with a remote source 104 and a terminal device 106. The data processing system 102 includes a computing system (e.g., a server system), such as described in detail with respect to FIG. 5, below. The data processing system 102 includes an interface 118, a parser engine 120, a search engine 122, a logic engine (124), a shared memory 126, an interface generation engine 128, and an analytics/content evaluation platform 136. The shared memory includes a library 130 of network request data, and a set of data structures 132.

The data processing system 102 is configured to respond to requests from the remote source 104, such as a network request 112 (e.g., HTTP request), with interaction data 114 (e.g., conversion data, event data, etc.). The interaction data 114 is responsive to the network request 112. The interaction data 114 comprising data associated with an interaction between the terminal device 106 and a computing resource (e.g., computing system, application, webpage, program, etc.) of the remote source 104. The contents of the interaction data 114 are determined by the data processing system 102 based on one or more parameters of the network request 112, as described below.

The data processing system 102 is configured to generate interaction data 114 that enables the remote source 104 to respond to interactions with a computing resource (not shown) of the remote source. The interaction data 114 can enable the remote source 104 to track occurrences of the interactions with the computing resource. For example, the interaction data 114 can enable the remote source 104 to send formatted requests to the analytics platform 136, which can be a part of the data processing system 102. In some implementations, the analytics platform includes a content evaluation platform (e.g., content auction platform). The data processing system 102 enables the remote source 104 to track the interactions with the computing resource (and send the formatted requests to the analytics platform 136) without requiring the remote source 104 to pre-define a list of interactions to track with the data processing system 102.

The data processing system 102 is configured to determine whether parameters of the network request 112 received from the remote source are indicative of an interaction that has been defined already for the publisher (e.g., advertiser) associated with the remote source 104. If the interaction is not already defined for the publisher, the data processing system 102 generates data that defines a new interaction event for that publisher and/or remote source 104. In some implementations, the publisher of content provided by the remote source 104 owns an account that stores the data defining the interaction event on the data processing system 102. In some implementations, another user (e.g., advertiser) associated with the remote source 104 owns the account on the data processing system 102 that stores the data. In some implementations, the account owner can be associated with many remote sources 104, as described below. If the interaction is already defined for the publisher, the data processing system 102 can respond with data (not shown) from the shared memory 126 responsive to the network request (e.g., analytics data, etc.) or perform some other function (e.g., content evaluation, content auction, etc.).

The generated data defining the interaction event is presented the account owner (e.g., publisher, advertiser, etc.) on a user interface. The account owner can decide to include the newly defined interaction event for other applications (e.g., analytics, advertising) by use of this user interface. Examples of the user interface are provided below in relation to FIGS. 2A-2C. The user interface enables a publisher (or other operator of the remote source 104 or associated computing system) to select, import, and manage interactions associated with the computing resource (or plurality of computing resources published by the publisher). For example, an analytics platform can send network requests 112 to the data processing system 102 and receive, from the data processing system 102, interaction data 114 including analytics parameters for tracking interactions of one or more resources. The analytics platform does not need to pre-format the network request for each particular interaction type for those one or more resources.

Figure 5:
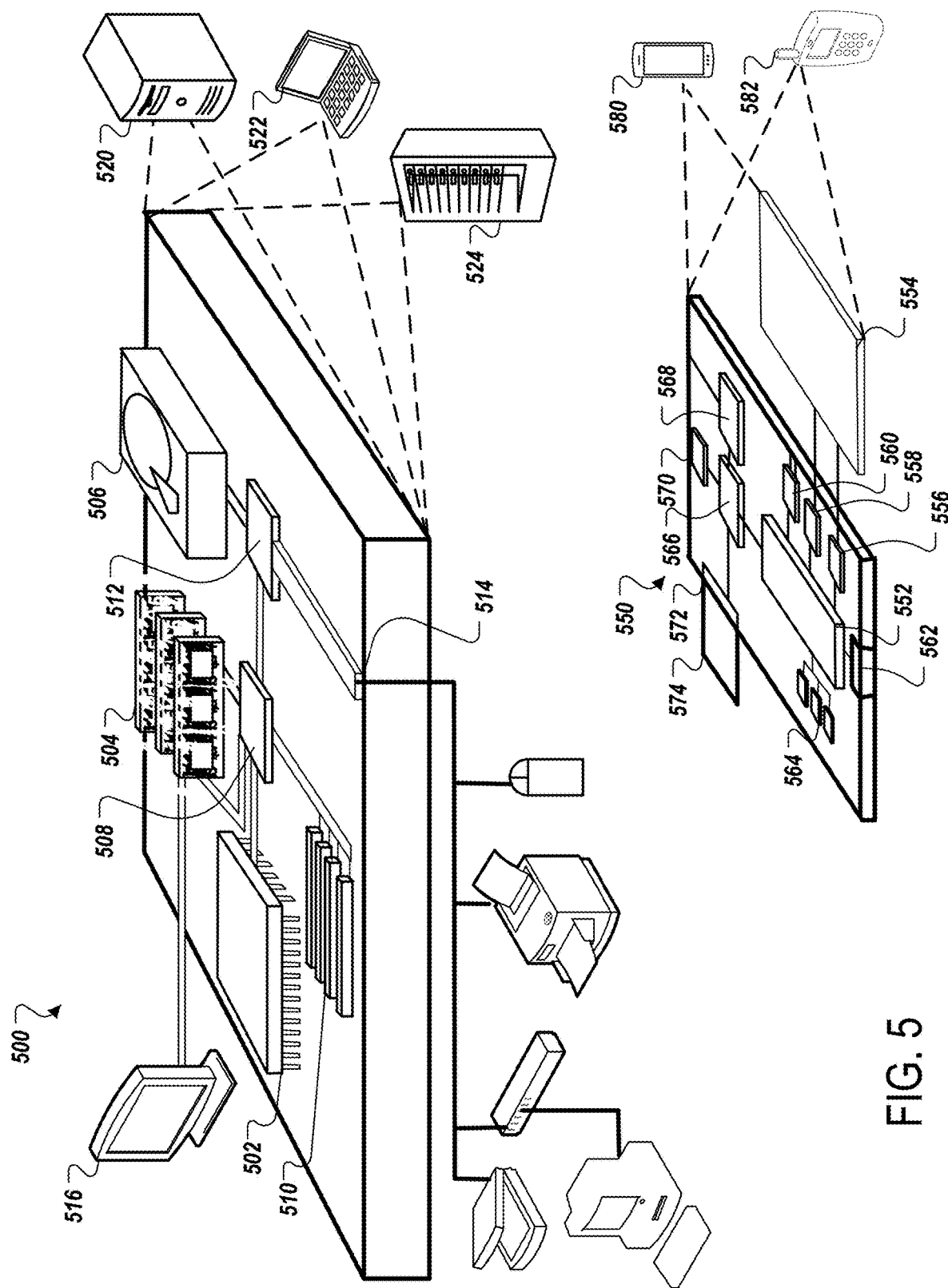
FIG. 5 is a block diagram of components of a computing system for generating interaction data from network requests.

The terminal device 106 includes a computing device, such as a laptop, tablet, mobile phone, or other computing device (e.g., a computing device of FIG. 5). The terminal device 106 transmits requests for content (e.g., application request 108) to the remote source 104. In some implementations, the terminal device 106 is a client device or end user device. In some implementations, the terminal device 106 executes a computing resource provided by the remote source 104, such as an application, webpage, etc. In some implementations, the terminal device 106 interacts with a computing resource executed by a computing system of the remote source 104.

The remote source 104 includes a computing system (e.g., a computing system described below in relation to FIG. 5) configured to interact with terminal device 106 and the data processing system 102. The remote source 104 interacts with the terminal device 106 either directly or indirectly. The remote source 104 interacts with the terminal device 106 directly by responding to data requests (such as application request 108) from the terminal device 106 with the requested data (e.g., application data 110). For example, the remote source can be a publisher of online content, and the terminal device 106 can request the online content from the remote source 104. In some implementations, the remote source 104 interacts with the terminal device 106 indirectly. In some implementations, the remote source 104 can provide a resource (e.g., application) to a publishing platform (not shown), which hosts the application for the remote source 104 and/or provides the resource to the terminal device 106. In response to an interaction of the terminal device 106 with the resource, the publishing platform can send data to the remote source indicative of the interaction by the terminal device 106. For example, when the terminal device 106 downloads an application provided by the remote source 104 from a publishing platform, the publishing platform can relay data indicative of the interaction to the remote source 104.

The data processing system 102 is configured to generate interaction data 114 that enables the remote source 104 to response to interactions with a computing resource (not shown) of the remote source. In some implementations, the computing resource includes an application, such as a game, social networking application, a fitness tracker, a navigation application, a web services application, payment application, personal assistant application, etc. For example, the interaction data can enable the remote source 104 to track downloads of the computing resource, clicks on content in the computing resource, transactions consummated in the resource, requests for particular content in the application, the detection of keywords, purchase of in-game currency, page views, visits to a particular location, or any such interaction with the computing resource. For example, a remote source 104 may wish to measure how frequently its users approach a café while using the application. In some implementations, combinations of these interactions can be classified as interactions that are tracked.

The components of the data processing system 102 are now described. The data processing system 102 includes an interface 118 that is configured to send and receive data from one or more other computing systems (e.g., the terminal device 106, the remote source 104) of the networked environment 100. In some implementations, the interface 118 includes a software interface, such as an Application Programming Interface (API), that facilitates communication with other computing systems. The interface 118 can include an input port. The interface 118 receives the network request 112 from the remote source 104 and sends the network request to the shared memory 126, the parser engine 120, the search engine 122, or other component of the data processing system 102 as appropriate.

The parser engine 120 includes logic for parsing the network request 112. The parser engine is configured to parse one or more parameters from the network request. The parameters can include one or more of a customer ID, an interaction type ID, a name of the remote source 104, an interaction location, an interaction source, an interaction category, an interaction delivery method, a method of counting the interaction (one per click, many per click, etc.), a link ID, an interaction name, an application ID, a platform name, and other similar parameters. Interaction types can include one or more of a first open event, automatic IAP event, application launch, completion of a registration of the application, application purchase, an item is added to a virtual cart in the application, an item is added to a wish list in the application, payment information is added in an application, a user registration in the application, a login of a user, a checkout process is initiated, an in-application purchase, a search query is entered, a level is achieved in the application, a tutorial is completed, particular content is viewed or accessed, content of the application is shared, the application is rated, an invitation is sent to other users to try the application, and a reservation (e.g., for another service) is completed in the application.

The parser engine 120 parses the parameters included in the network request 112 and sends the parameters that are found to the search engine 122. The parser 120 also extracts a key that indicates the account associated with the application or the campaign associated with the application. The key indicates to the search engine 122 that account with which to associate the network request 112 and where to search in the shared memory 126 for data associated with the parameters of the network request. For example, the key may indicate that a user of account "A" is sending the network request. The search engine 122 then searches a data structure, of the data structures 132, associated with account "A" for data responsive to the network request 112.

The search engine 122 searches the data structure, of the data structures 132, based on the key, which indicates the account associated with the network request 112. In some implementations, the remote source 104 can own many accounts. In some implementations, a separate data structure stores data for each account. In some implementations, a data structure stores data for several associated accounts. In some implementations, a data structure stores data for accounts that are not associated, but the key indicates where in the data structure to find one or more entries associated with the account represented by the key.

The search engine 122 searches the shared memory 126, based on the parameters and key received from the parser, for a data structure, of the data structures 136, associated with the account represented by the key and associated with the remote source 104. If a data structure is not found, the search engine 122 indicates to the logic engine 124 that a new data structure for the account should be generated. If the data structure (account) is found, the search engine 122 searches for an entry comprising the parameter included in the network request 112 (e.g., an entry comprising data that defines the interaction event). If an entry is found, the search engine 122 can report to the logic engine 124 that the interaction event has been defined for the remote source 104. The logic engine 124 sends a request to the analytics platform (e.g., content evaluation platform or auction platform) to solicit bids for the interaction event (or perform some other action). If no entry is found, the search engine 122 reports to the logic engine that a new interaction event should be defined for the remote device 104. The logic engine 124 generates a new entry in the associated data structure. The new entry in the data structure is responsive to subsequent interaction events of the type specified in the network request 112, and is thus searchable by the search engine 122 and responsive to subsequent network requests (e.g., HTTP requests) of the same type (e.g., including at least one of the same parameter values that specify the interaction type). In some implementations, the new data entry is searchable and responsive to subsequent network requests of the same type (e.g., including one or more parameters specifying the interaction type) only if activated by an account user though a user interface. If a user chooses not to activate a response to subsequent network requests, the request is dropped when received by the data processing system 102 (rather than generating another data entry) because the interaction type has already been defined by the data processing system.

The user interface is updated by the interface generation engine 128 to include one or more controls (e.g., buttons, sliders, etc.) that enable a user to import the interaction data 114 to the user's system (e.g., for analytics, etc.). The user interface can be updated to include one or more controls enabling the user to activate or deactivate tracking (e.g., for analytics or advertising) for the newly defined interaction type. Example interfaces are described below in relation to FIGS. 2A-2C.

The data processing system 102 thus has improved flexibility for responding to network requests (e.g., HTTP request) including data (e.g., one or more parameters) that has not been pre-defined by the remote source 104 (e.g., specifying an interaction type that has not been pre-defined by the remote source). The data processing system 102 dynamically configures a response to parameters in the network request specifying an undefined interaction with a resource of the remote source. The data processing system 102 is configured to handle subsequent network requests (e.g., HTTP requests) with parameters specifying the interaction without requiring the remote source 104 to provide a correctly configured request.

The data processing system 102 enables a remote source 104 with many accounts to update all the accounts together. For example, if the remote source 104 publishes several applications, the account for each application can be updated simultaneously, and the remote source 104 need not provide a configuration request for each account. Thus, cross-account interactions can be tracked and managed together.

The data processing system 102 includes a library 130 of network requests (e.g., HTTP requests) including parameters that specify interaction types. These stored network requests in the library 130 can serve as test data to prepopulate a data structure. Generally, the data structures 132 are generated and updated in response to receiving network requests (e.g., network request 112) from the remote source 104. There can be a delay in responding to the remote source 104 with interaction data 114 if the response, to the undefined interaction type specified by the network request, is generated dynamically as described above. When an account is generated, the data processing system 102 can automatically populate the associated data structure(s) with entries comprising the interactions of the system using the library 130. The network requests of the library 130 are stored in response to receiving the requests from the remote source 104 in advance of "real-world" requests being made on the application of the remote source. In this way, the data processing system 102 supports incomplete interaction testing and data structure generation, which can decrease a delay, for responding to "real-world" network requests (e.g., HTTP requests), caused by dynamically generating the interaction data (e.g., conversion data) at that time.

Figure 2A:
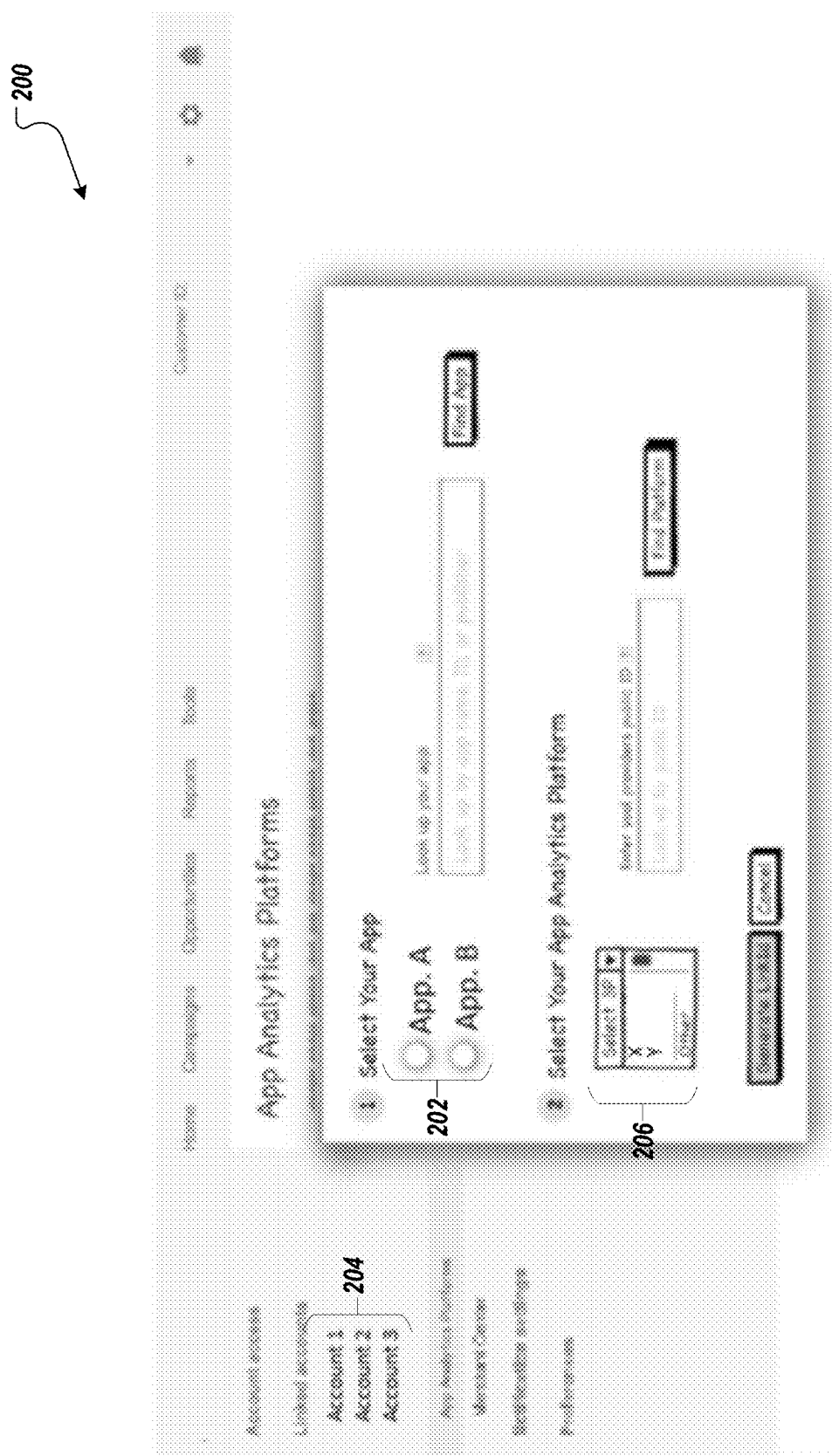
FIGS. 2A-2C show graphical user interfaces for displaying interaction data associated with a network request.
Figure 2B:
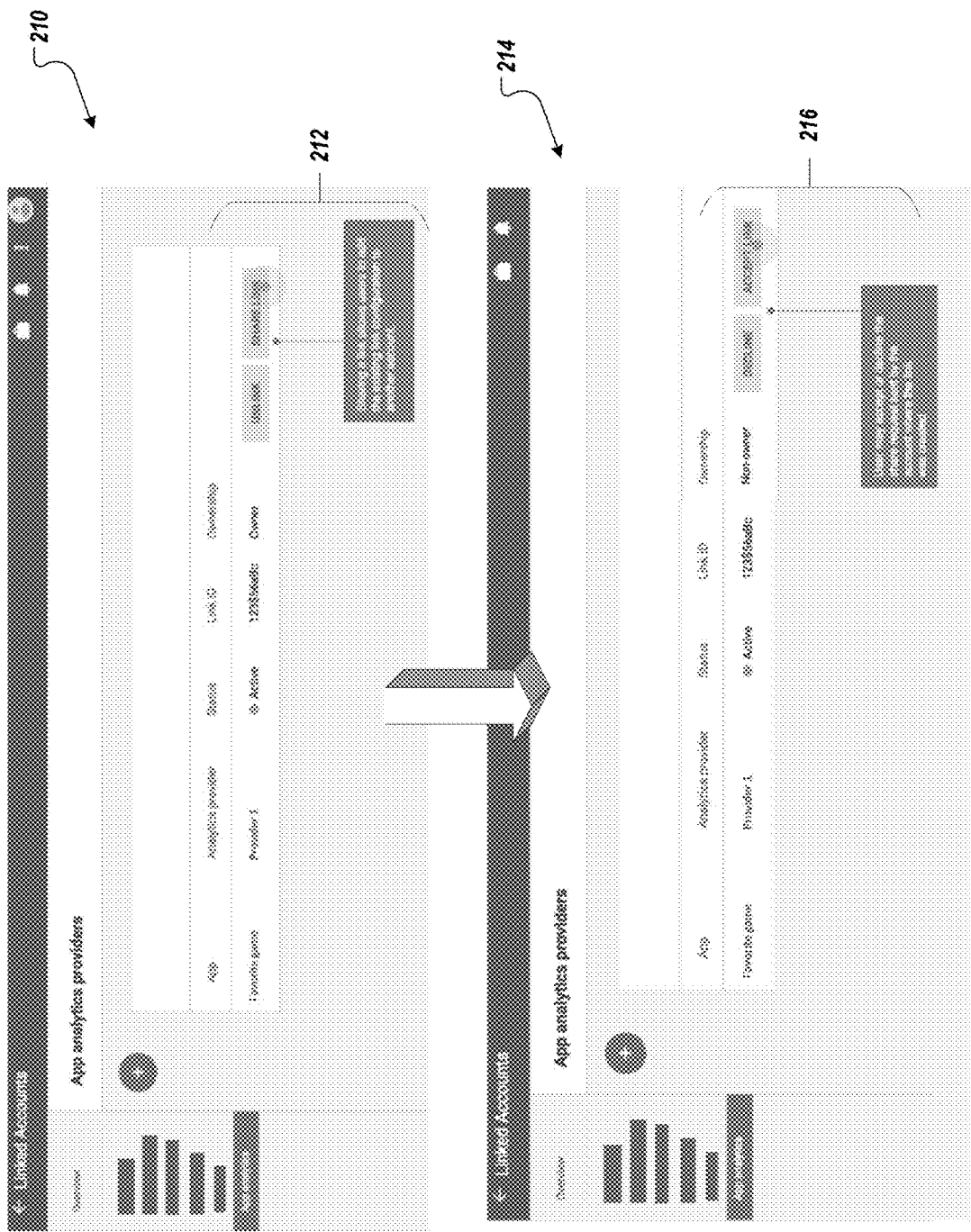
Figure 2C:
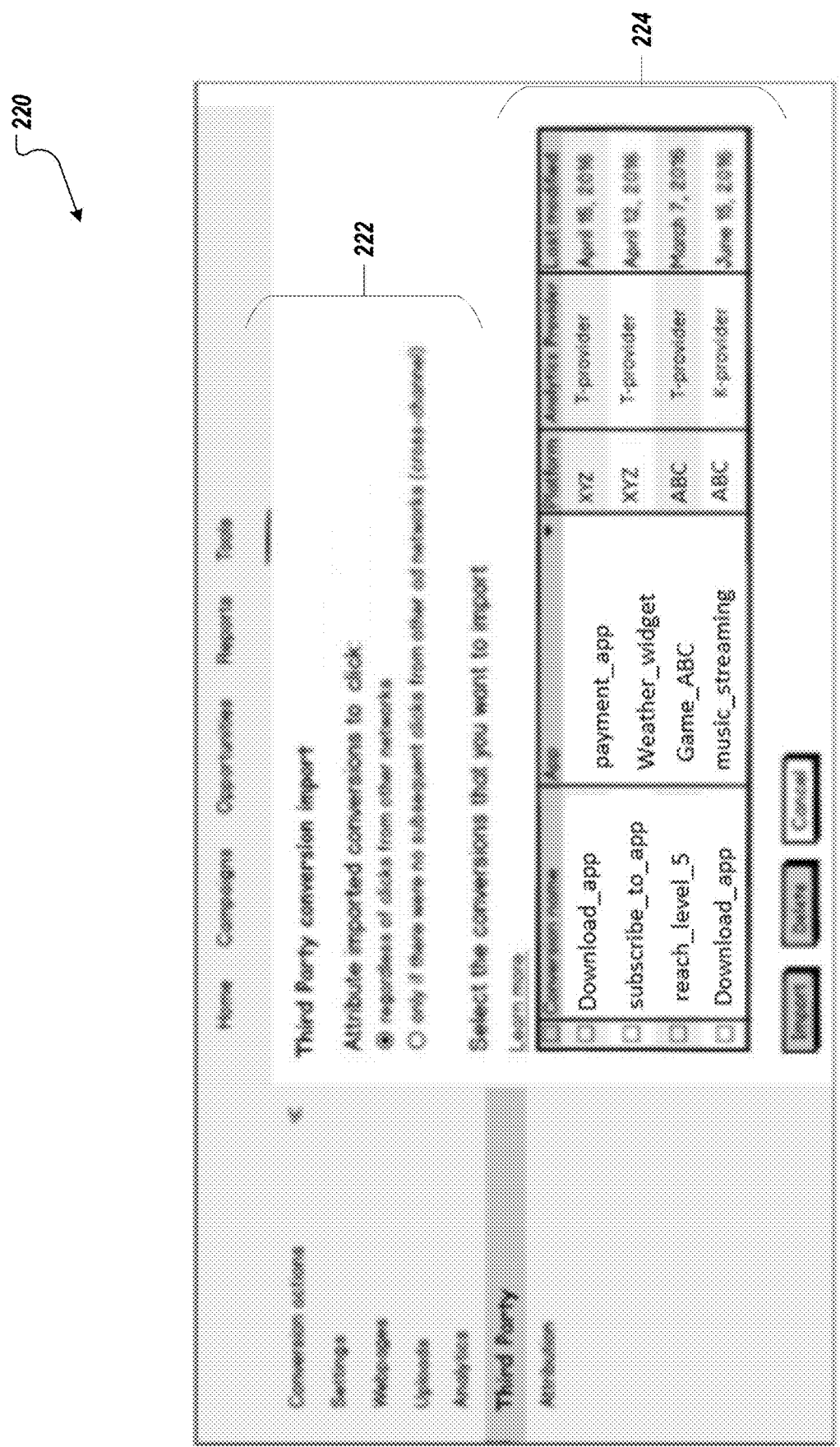

Referring to FIGS. 2A-2C, example interfaces 200, 210, and 220 for interacting with the data processing system (e.g., data processing system 102 of FIG. 1). FIG. 2A shows interface 200. The user interface enables users to link their resource with the data processing system 102 with a particular link defined by a link ID. The user can be, for example, an owner of the remote source 104, an advertiser, or both. The user interface is used to generate a link that is common to the user. The common link enables a user to cross-link multiple accounts. For example, an advertiser may wish to link another analytics tool to the data processing system 102. The accounts 204 of the user can share interaction data (e.g., for attribution purposes). The interface 200 is used to generate a link that is specific to the remote source (e.g., remote source 104 of FIG. 1) and the associated application (or other computing resource) of the remote source. The application is identified using one of controls 202. The remote source 104 is identified using controls 206. The link is pasted into the application of the remote source to link the accounts.

FIG. 2B shows interfaces 210, 214, which include a security measure for the remote source 104. The security measure prevents fake injection of interaction data into another remote source's resource by knowing the link described in relation to FIG. 2A.

Interface 210 shows a control 212 for sharing the link described above for linking accounts. The user sharing the link between the two accounts can offer to share the link with a second account. Interface 214 shows a user receiving the offer for sharing the link between accounts. The user accepts the link using the control 216. The offer and acceptance flow ensures that, if an unauthorized user knows the link ID described above, the unauthorized user cannot misuse the link ID.

In some implementations, the interface 210 enables a user associated with the remote source 104 to add a security code to their link. A control (not shown) is used to enable the user to include the link particular to the user's accounts. A control (not shown) enables the user to append a security code to the link. In this way, data processing system 102 will recognize and respond to network requests (e.g., HTTP requests) only from authorized users.

FIG. 2C includes an interface 220 for importing interaction data for one or more interactions. A user (e.g., owner of the remote source 104 or otherwise associated with the remote source) can specify which interactions to track as described above by selecting the interactions from a list. Simply by selecting the generated interaction types, generated by the data processing system 102, the user can activate or deactivate tracking the interaction type for their resource. Additionally, as shown in the interface 220, the user can import conversion events from another source (e.g., another tracking source) to include in the data processing system 102. The data processing system 102, based on the third party interaction data, determines whether the interaction has been defined in the account of the user already or whether a new interaction event should be defined, as described above. The user, using controls 222, can specify what kinds of interactions qualify. The user, using controls 224, can specify which interaction events to import from the third party tracking resource. As stated above, if any of the imported interactions are not already defined in the data processing system 102, the data processing system 102 can automatically generate interaction data 114 for each new interaction type.

Figure 3:
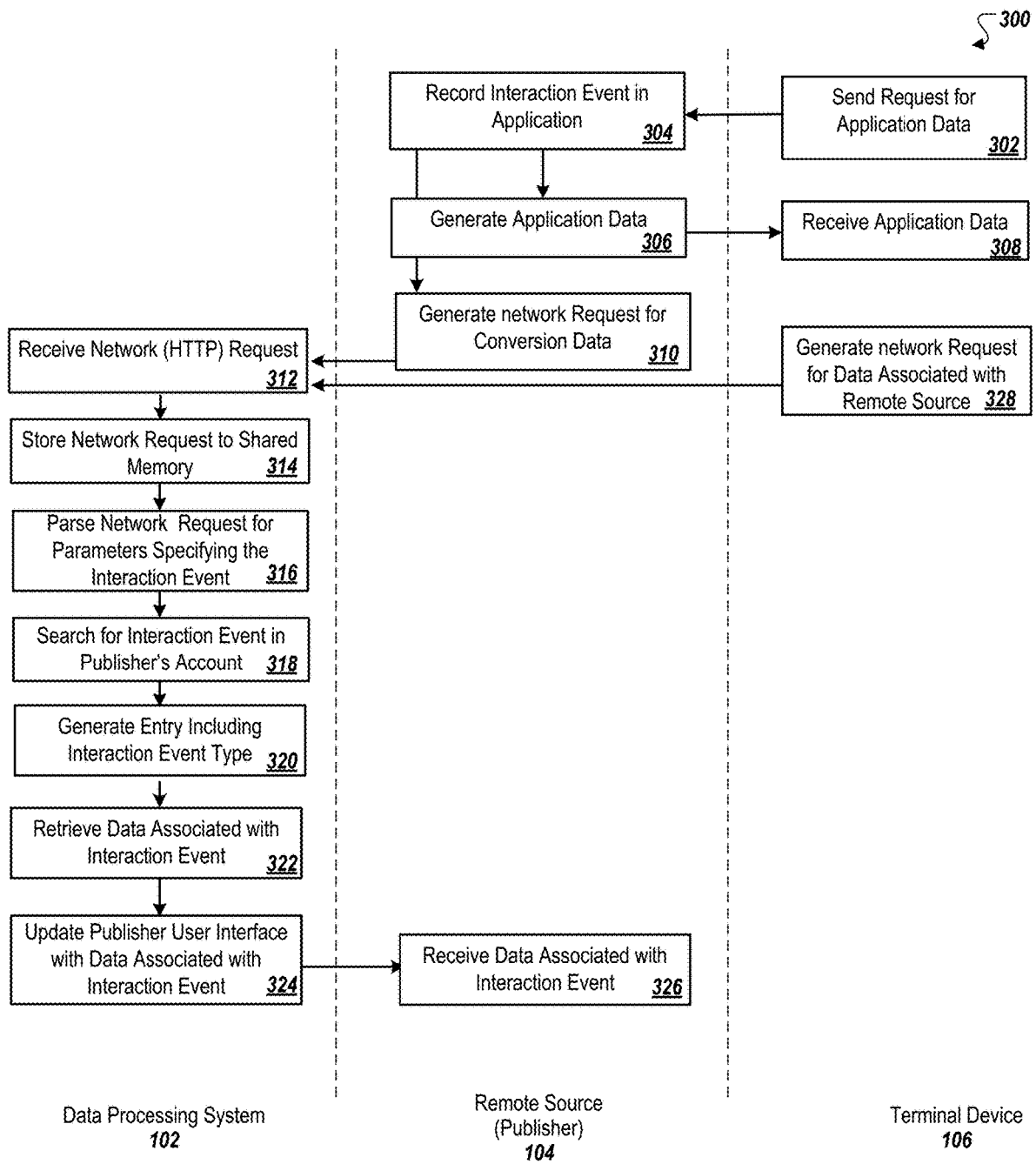
FIGS. 3-4 are flowcharts showing actions taken for generating interaction data from network requests.

Referring to FIG. 3, a block diagram 300 showing an example process for generating data from a network request (e.g., HTTP request) is shown. The terminal device 105 sends (302) a request for application data to the remote source 104. The remote source records (304) the interaction event in the application (e.g., an in-application purchase, download, etc.). The remote source generates (306) application data. For example, the remote source may send a copy of the application for download, may advance the user to the next level in a game, and so forth. The terminal device 106 receives (308) the application data. The remote source 102 generates (310) a network request for conversion data. For example, the network request may be configured for being sent to an ad exchange or to a tracking platform of the data processing system 102. The data processing system 102 receives (312) the network request. The data processing system 102 stores (314) the network request to a shared memory. The data processing system 102 parses (316) the network request for parameters specifying the interaction event. The data processing system 102 searches (318) the shared memory for a related interaction event associated with an account of the remote source 104 (e.g., a publisher's account). The data processing system 102 generates (320) an entry including the interaction event type of the network request. The data processing system 102 retrieves (322) data associated with the interaction event. The data processing system 102 updates (324) the user interface for the account of the publisher with data associated with the interaction event. In some implementations, the data includes a control enabling the user to import the new conversion event type into a tracking/advertising campaign. The remote source 104 receives (326) the data associated with the interaction event, e.g., in the user interface. In some implementations, the terminal device 106 directly generates and sends (328) the network request for data associated with the remote source. The data processing system 102 can automatically generate a new conversion event as before.

Figure 4:
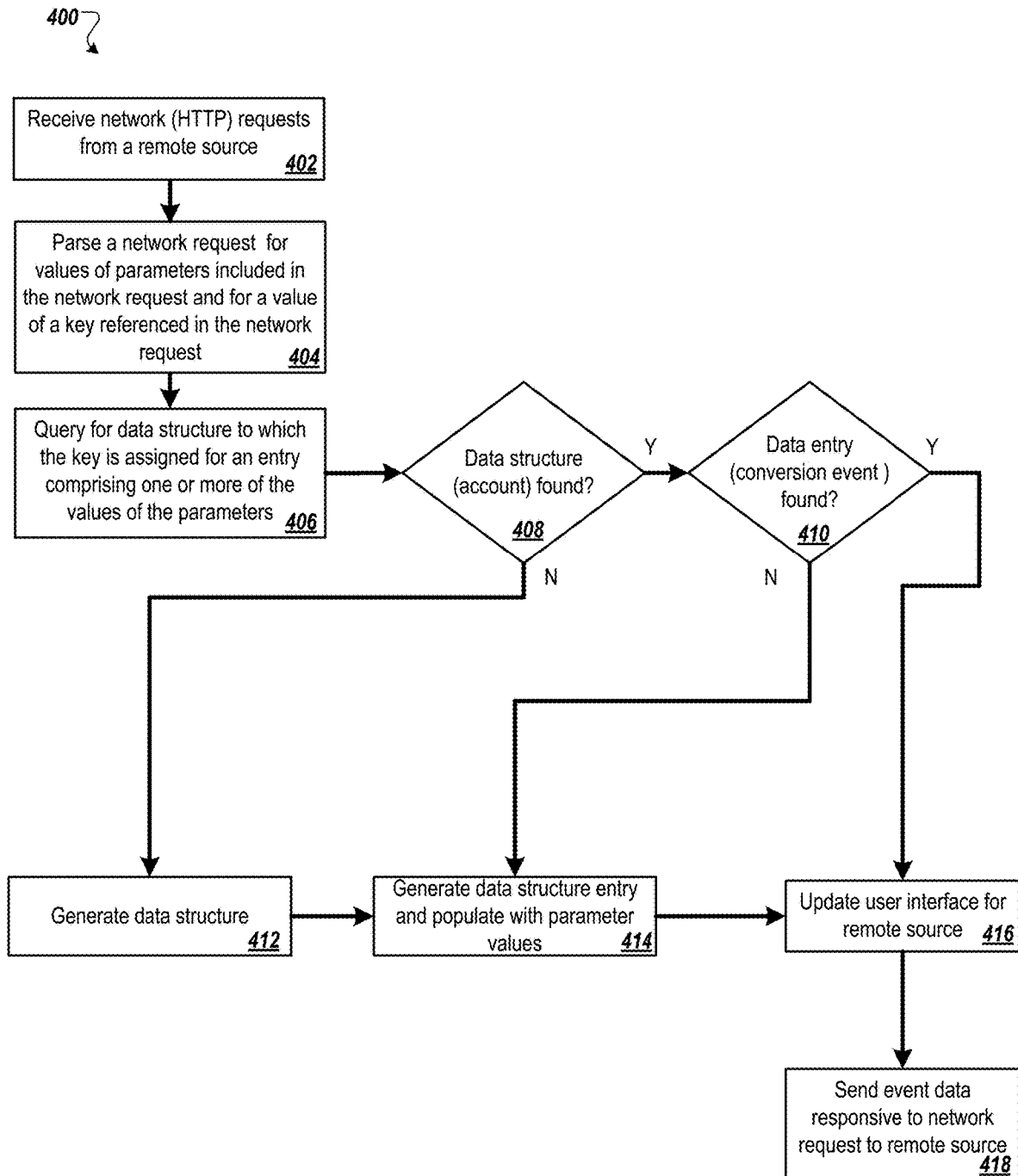

Referring to FIG. 4, a flow diagram 400 showing a process for generating data in response to receiving a network request (e.g., HTTP request) is shown. The data processing system 102 receives (402) one or more network request from a remote source. The data processing system 102 parses (404) a network request for values of parameters included in the network request and for a value of a key referenced in the network request. The key indicates an account associated with the network request. The data processing system 102 queries (406) a shared memory for a data structure to which the key is assigned. The query is further for an entry of the data structure comprising one or more of the values of the parameters. If the data structure (account) is not found (408), a new data structure is generated (412) by the data processing system 102. If a data structure is found (408), the data processing system 102 searches for an entry in the data structure that includes the parameters. If no entry is found (410), the data processing system 102 generates (414) a data structure entry for the interaction type specified in the parameters and populates the entry with the parameter values. Once an entry is found or generated, the data processing system 102 updates (416) the user interface for the remote source. The data processing system 102 sends (418) the interaction data responsive to the network request to the remote source if applicable. In some implementations, data is sent to a tracking or advertising exchange.

FIG. 5 is a block diagram of computing devices 500, 550 that may be used to implement the systems and methods described in this document, either as a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. In addition, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In-Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 862.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may include sound generated by applications operating on device 550.

The computing device 550 may be implemented in a number of different forms, as shown in the figure. For example, it may be implemented as a cellular telephone 582. It may also be implemented as part of a smartphone 580, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

The features described is implemented in digital electronic circuitry, in computer hardware, firmware, software, or in combinations of them. The apparatus is implemented in a computer program product tangibly embodied in an information carrier, e.g., in a machine-readable storage device for execution by a programmable processor; and method steps is performed by a programmable processor executing a program of instructions to perform functions of the described implementations by operating on input data and generating output. The described features are implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that is used, directly or indirectly, in a computer to perform a certain activity or bring about a certain result. A computer program is written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory is supplemented by, or incorporated in, ASICs (application-specific integrated circuits).

To provide for interaction with a user, the features is implemented on a computer having a display device such as a CRT (cathode ray tube) or LCD (liquid crystal display) monitor for displaying information to the user and a keyboard and a pointing device such as a mouse or a trackball by which the user provides input to the computer.

The features are implemented in a computer system that includes a back-end component, such as a data server, that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system includes clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. Moreover, other mechanisms for generating interaction data from network requests may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A system comprising:
   at least one programmable processor; and
   a machine-readable medium storing instructions that, when executed by the at least one programmable processor, cause the at least one programmable processor to perform operations comprising:
      parsing a network request to identify (a) one or more values of parameters that specify an interaction with an application and are included in the network request and (b) a value of a key that identifies an account and is included in the network request;
      querying a plurality of data structures to retrieve a particular data structure stored in association with the parsed value of the key identifying the account;
      detecting, in the data structure, an absence of a particular entry that matches the one or more values of the parameters specifying the interaction with the application in the network request;
      generating, in response to detecting the absence of the particular entry, a new entry in the particular data structure for data representing the interaction with the application; and
      storing, in the new entry, the one or more values of the parameters specifying the interaction with the application.

2. The system of claim 1, wherein the operations further comprise:
   receiving the network request from a remote source.

3. The system of claim 2, wherein at least one of the parameters comprises data indicative of an interaction between an end user and a computing resource of the remote source, and wherein the new entry in the particular data structure is configured to store data representing the interaction.

4. The system of claim 3, wherein the remote source comprises a computing system of a publisher of online digital content, and wherein the computing resource comprises an application published by the publisher.

5. The system of claim 3, wherein the operations further comprise:
   configuring a user interface for presentation at the computing resource of the remote source; and
   configuring the user interface to include a control enabling a user to activate or deactivate tracking of the interaction with the application represented by the one or more values of the parameters stored in the new entry.

6. The system of claim 3, wherein the data representing the interaction comprises conversion data.

7. The system of claim 2, wherein the account is a first account and wherein the remote source is associated with a plurality of accounts,
   wherein the operations further comprise:
      querying a plurality of data structures, wherein at least one data structure of the plurality of data structures is associated with a second account of the plurality of accounts of the remote source.

8. The system of claim 7, wherein the operations further comprise:
   including, in response to detecting the absence of the particular entry in the plurality of data structures, the new entry in each of the plurality of data structures.

9. The system of claim 2, wherein the new entry in the particular data structure is searchable in response to receiving a subsequent network request from the remote source.

10. A method comprising:
parsing a network request to identify (a) one or more values of parameters that specify an interaction with an application and are included in the network request and (b) a value of a key that identifies an account and is included in the network request;
querying a plurality of data structures to retrieve a particular data structure stored in association with the parsed value of the key identifying the account;
detecting, in the data structure, an absence of a particular entry that matches the one or more values of the parameters specifying the interaction with the application in the network request;
generating, in response to detecting the absence of the particular entry, a new entry in the particular data structure for data representing the interaction with the application; and
storing, in the new entry, the one or more values of the parameters specifying the interaction with the application.

11. The method of claim 10, further comprising:
receiving the network request from a remote source.

12. The method of claim 11, wherein at least one of the parameters comprises data indicative of an interaction between an end user and a computing resource of the remote source, and wherein the new entry in the particular data structure is configured to store data representing the interaction.

13. The method of claim 12, wherein the remote source comprises a computing system of a publisher of online digital content, and wherein the computing resource comprises an application published by the publisher.

14. The method of claim 12, further comprising:
configuring, by an interface generation engine, a user interface for presentation at the computing resource of the remote source; and
configuring the user interface to include a control enabling a user to activate or deactivate tracking of the interaction with the application represented by the one or more values of the parameters stored in the new entry.

15. The method of claim 12, wherein the data representing the interaction comprises conversion data.

16. The method of claim 11, wherein the account is a first account and wherein the remote source is associated with a plurality of accounts, wherein the method further comprises:
querying a plurality of data structures, wherein at least one data structure of the plurality of data structures is associated with a second account of the plurality of accounts of the remote source.

17. The method of claim 16, further comprising:
including, in response to detecting the absence of the particular entry in the plurality of data structures, the new entry in each of the plurality of data structures.

18. The method of claim 11, wherein the new entry in the particular data structure is searchable in response to receiving a subsequent network request from the remote source.

19. A non-transitory computer program product storing instructions that, when executed by at least one programmable processor, cause the at least one programmable processor to perform operations comprising:
parsing a network request to identify (a) one or more values of parameters that specify an interaction with an application and are included in the network request and (b) a value of a key that identifies an account and is included in the network request;
querying a plurality of data structures to retrieve a particular data structure stored in association with the parsed value of the key identifying the account;
detecting, in the data structure, an absence of a particular entry that matches the one or more values of the parameters specifying the interaction with the application in the network request;
generating, in response to detecting the absence of the particular entry, a new entry in the particular data structure for data representing the interaction with the application; and
storing, in the new entry, the one or more values of the parameters specifying the interaction with the application.

* * * * *